United States Patent [19]
Fontaine

[11] Patent Number: 5,742,771
[45] Date of Patent: Apr. 21, 1998

[54] METHOD TO ENSURE THE CONFIDENTIALITY OF A VOCAL LINK AND TELECOMMUNICATIONS LOCAL AREA NETWORK IMPLEMENTING THE METHOD

[75] Inventor: Philippe Fontaine, Paris, France

[73] Assignee: Thomson-CSF, Paris, France

[21] Appl. No.: 494,692

[22] Filed: Jun. 26, 1995

[30] Foreign Application Priority Data

Jun. 28, 1994 [FR] France .................. 94 07948

[51] Int. Cl.$^6$ .................. G06F 13/374
[52] U.S. Cl. .................. 395/200.55; 395/200.68; 395/187.01; 380/49; 370/523
[58] Field of Search .................. 395/200.06, 200.15, 395/200.16, 2.82, 187.01, 186; 364/514 A; 380/25, 49; 379/95; 370/523, 524, 264, 405, 434, 462

[56] References Cited

U.S. PATENT DOCUMENTS

| | | | |
|---|---|---|---|
| 4,679,226 | 7/1987 | Muehleisen | 379/95 |
| 4,723,283 | 2/1988 | Nagasawa et al. | |
| 4,763,351 | 8/1988 | Lipscher et al. | 379/95 |
| 4,870,571 | 9/1989 | Frink | 395/200.16 |
| 4,888,796 | 12/1989 | Olivo, Jr. | 379/95 |
| 4,919,545 | 4/1990 | Yu | 380/25 |
| 5,040,177 | 8/1991 | Martin et al. | 370/524 |
| 5,115,466 | 5/1992 | Presttun | 379/95 |
| 5,210,794 | 5/1993 | Brunsgard | 370/524 |
| 5,349,583 | 9/1994 | Christensen et al. | 370/434 |
| 5,396,493 | 3/1995 | Sugiyama | 395/200.15 |
| 5,509,009 | 4/1996 | Laycock et al. | 370/264 |
| 5,515,513 | 5/1996 | Metzger et al. | 395/200.15 |

FOREIGN PATENT DOCUMENTS 0 176 215  4/1986  European Pat. Off.

OTHER PUBLICATIONS

"AT&T introduces service node controller to improve network"; Telecommunications Report, May 10, 1989.

ITU-T Recommendation I.120; "Integrated Services Digital Network (ISDN) General Structure"; International Telecommunications Union (ITU), 1993.

CCITT Recommendation X.800; "Data Communication Networks: Open Systems Interconnection (OSI); Security, Structure and Applications"; International Telegraph and Telephone Consultative Committee (CCITT), 1991.

Review of the Electrical Communication Laboratories, vol. 30, No. 4, "Digital Key Telephone System With Complex Communication Functions", Isao Kawashima, et al. pp. 704–711, 1982/Tokyo, Japan.

Phillips Telecommunication Review, vol. 37, No. 3, "An On–Board Digital Transmission System", G. David, et al. pp. 170–176, Aug. 1979.

(List continued on next page.)

Primary Examiner—Alpesh M. Shah
Assistant Examiner—Mark H. Rinehart
Attorney, Agent, or Firm—Oblon, Spivak, McClelland, Maier & Neustadt, P.C.

[57] ABSTRACT

A method and system to ensure the confidentiality of a local area network when a first terminal of the local area network sends out a first and second plurality of voice messages which, respectively, may and may not be received by a second terminal, consists of providing a signature distributed over the first plurality of voice messages with a portion of the signature substituted for the least significant bit of the first plurality of voice messages. Filtering is provided in the second terminal which extracts the signature from the first plurality of voice messages arriving at the second terminal and which recognizes the signature. The filtering disconnects the second terminal from the network, for a given period of time, if the predetermined message has not been recognized. The method and system to ensure the confidentiality of a local area network is suited for integrated services digital networks (ISDN) applications.

24 Claims, 3 Drawing Sheets

OTHER PUBLICATIONS

ICC'83 Session D2, Paper 5;, vol. 2, "Local Area Military Network", Deepinder P. Sidhu, pp. 957–968, Jun. 1983.

Patent Abstracts of Japan, vol. 5, No. 30, (E–47), Feb. 24, 1981, "Selective Signal Transmission System", Senzuo Sakasai.

Patent Abstracts of Japan, vol. 6, No. 234, (E–143) Nov. 20, 1982, "Data Transmission Device", Shinji Azumi.

Patent Abstracts of Japan, vol. 6, No. 205, (E–136) Oct. 16, 1982, "Add–On Connection System", Yousuke Honda, et al.

METHOD TO ENSURE THE CONFIDENTIALITY OF A VOCAL LINK AND TELECOMMUNICATIONS LOCAL AREA NETWORK IMPLEMENTING THE METHOD

BACKGROUND OF THE INVENTION

The present invention relates to local area networks and, in particular, to ISDN i.e. Integrated Services Digital Networks. The invention relates, more particulary, to the confidentiality of certain calls made by means of B channels between a first terminal of the network and several others terminals of the network.

Typically in ISDN networks, a call is set up by the sending of information elements in D channels and that the rights of access to the information flowing in the B channels are verified by the use of directories set up by means of a software program, these directories designating the terminals for which a given message is intended.

To prevent instances where a switching error or ill-intentioned manipulation of the directories may cause a message to be broadcast to a terminal for which this message is not intended, one approach consists in enciphering the information in the transmission terminal and equipping only those terminals for which a transmission is intended with corresponding deciphering means. This is a costly approach whose implementation is not always possible owing to the volume of space taken up by the encoding and decoding means and the space available in the terminals.

SUMMARY OF THE INVENTION

The present invention is aimed at preventing or, at least, at reducing these drawbacks. This object is acheived by incorporating specific messages called signatures in the vocal information elements that are sent out by the terminals and flow in the B channels and by the interposing a blocking means in front of the terminals that are not authorized to receive certain information elements. These blocking means do not permit the passage of information to these terminals unless the information elements are preceded by a predetermined signature.

According to the present invention, there is provided a method to ensure the confidentiality of a vocal link in a telecommunications local area network comprising at least three distinct terminals and voice transmission paths between the terminals, that consists in introducing filtering means into the voice transmission paths from a first of the terminals towards n of the other terminals, with n as an integer at least equal to one, each of the filtering means having the role of recognizing a predetermined message in the path into which it is introduced and of breaking the path into which it is introduced if, for a given period of time, it has not recognized a message that is similar in every point to the predetermined message and that consists in giving the first of the terminals the possibility of inserting, in at least some of the vocal messages that it transmits, a specific signature constituted by a given message that is repeated with a given period in order to clear the way through those filtering means for which the vocal message, that they have the role of recognizing, corresponds to the specific signature.

According to the present invention, there is further provided a telecommunications local area network comprising a control station, k loops with k as an integer at least equal to one, connected to the control station, concentrators inserted in the loops and at least three distinct terminals connected in the network by the concentrators to transmit and receive vocal messages by paths using the station, the k loops and the concentrators, this network comprising voice transmission paths from a first of the terminals towards n of the other terminals, with n as an integer at least equal to one, filtering means in these paths, each of the filtering means being designed to recognize a predetermined message in the path into which it is introduced and to break the path into which it is introduced if, for a given period of time, it has not recognized a message that is similar in every point to the predetermined message, and the first of the terminals having the possibility of inserting, in at least certain of the vocal messages that it transmits, a specific signature constituted by a given message that is repeated with a given period in order to clear the way through those of the filtering means for which the vocal message, that they have the role of recognizing, corresponds to the specific signature.

BRIEF DESCRIPTION OF THE DRAWINGS

The present invention shall be understood more clearly and other features shall appear from the following description and from the figures pertaining thereto. Of these figures.

DETAILED DESCRIPTION OF THE PREFERRED EMBODIMENTS

In FIGS. 1, 2, 4 and 5, since the precise synchronization devices relate to current technology, they have not been shown in order to make the drawings clearer and in order to simplify the explanation.

In order that, in the following description, whatever relates specifically to the invention appears clearly, the explanations on all that pertains to the standard technology of ISDN type local area networks will consist most often in stating what has to be done by those skilled in the art. However, certain functions of ISDN type local area networks will be explained so that even the non-specialist reader will be able to understand these functions without difficulty. Furthermore, the description will be made with reference to local area networks in steady operating mode without mentioning control stations in a standby state or redundant paths. Thus, reference will be made only to those control stations that carry out the management of the network and, for dual paths, reference will be made only to that one of the two paths that conveys the information elements.

Figure 1:
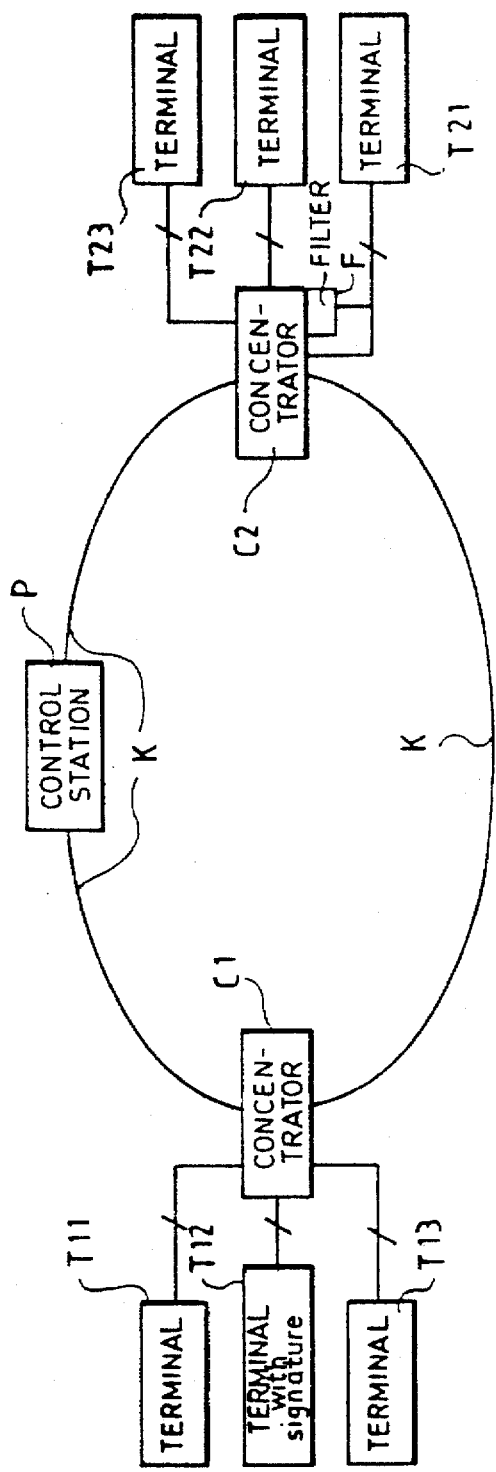
FIG. 1 and 4 show networks to which the invention can be applied.

FIG. 1 shows a local area network having only one loop K, with a control station P and two concentrators C1, C2, also called connection units, to which there are respectively connected terminals T11, T12, T13 and T21, T22, T23. In this embodiment, it will be assumed that it is not desirable for the vocal messages sent out by the terminal T12 to be listened to by the terminal T21.

Typically, in a loop, information flows in the form of 125 μs frames and one frame has 1,024 time slots (TS) with one byte per TS.

Of the 1,024 TS of a frame, the first one is dedicated to synchronization and the following ones are assigned by the control station to form the B and D channels. The B channels are designed to convey information elements, especially vocal information elements, and the D channels are designed to convey the flagging information and, as the case may be, certain information elements but without it being necessary that the information elements or the flagging information have a confidential character and therefore have to be safeguarded.

When the user of the terminal T12 decides that the vocal information element that he will transmit, for example to the terminals T22, T23, should also be received by the terminal T21, he puts the signature function into operation from his terminal. This action consists, firstly, in informing the control station, by means of a D channel, of the call to be made. If the control station deems it possible to set up the call, it assigns a B channel for the duration of the call. The action consists secondly in associating the vocal information with a specific signature, Sd, namely a given message that is repeated with a given period and is designed to permit access to the terminal T21. This signature, which will be described further below by means of an example, will enable the transmission of vocal information elements up to the terminal T21. When this signature is absent, the vocal information will be blocked before reaching the terminal T21 as shall be later decribed.

FIG. 1 shows a filter of calls F within an ISDN network. This filter F is positioned in one of the outputs of the concentrator C2 that provides information to the terminal T21 with the information elements coming from the B channels. It is this filter F that makes it possible to prevent the transmission of vocal information elements to the terminal T21 in the absence of the specific signature Sd referred to in the above paragraph. In the example described, this filter F is always active, namely it does not let through any vocal information unless it is activated by the specific signature referred to above. In other cases filter of calls F could be remote-controlled by the control station P to be made transparent, namely to let through vocal information even when there is no specific signature.

Figure 2:
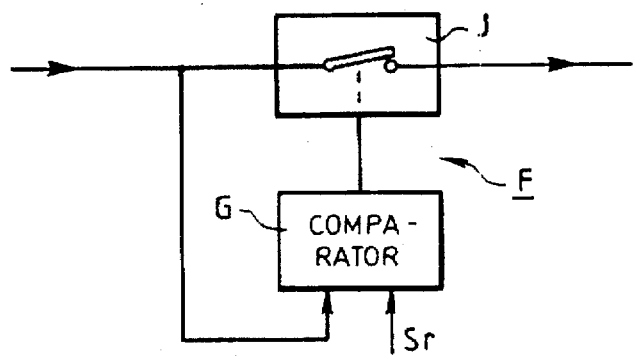
FIG. 2 shows a filter of calls that is used in networks according to the invention.

The filter of calls F is shown in greater detail in FIG. 2. it has an input that receives the vocal information TS and an output connected to the input by a switch J. The closing of the switch J is controlled by a comparator G including an output monostable trigger circuit. This comparator G which permanently receives the vocal information time slots makes a search therein for the presence of a predetermined message Sr formed by a predetermined sequence of time slots whose structure is made known to it, at a reference input, by the control station. It must be noted that this message is memorized in the comparator until erasure under the control of the control station.

So long as the signature Sd transmitted with the vocal information does not correspond to the predetermined message Sr, the switch J remains open. It closes only when Sd=Sr and, by means of the output monostable trigger circuit of the comparator G, it remains closed for a time that is slightly greater than the repetition period of the signature Sd. Thus, the confidentiality of the calls from the terminal T12 is properly safeguarded as with regard to the terminal T21. In contrast, if the terminal T12 or any one of the other terminals of the station according to FIG. 1 seeks to transmit vocal messages to the terminal T21, all it will have to do will be to transmit a message having the structure of the specific signature Sd to the filter F by a D channel, through the control station P and the concentrator C2, so that this filter F turns the transmitted message into the predetermined message Sr to be sought in the vocal information elements received at the input of filter F.

On the basis of the above-mentioned embodiment, which is one of the simplest that can exist, it is easy to go on to more complex embodiments.

Thus, for example, the circuit according to FIG. 1 may be modified by adding the "signature" function in the terminals T11, T13, T21, T22, T23 and by introducing five other filters similar to the filter F: three between the concentrator C1 and the terminals T11, T12, T13 respectively and two between the concentrator C2 and the terminals T22, T23 respectively. It is then possible, using any of the six terminals according to FIG. 1, to decide that the vocal information elements to be sent out could be received by any of the other five terminals. For this purpose, the transmitter terminal sends a message to the control station P containing the signature Sd and the station P sends the structure of the specific signature Sd to the corresponding transmitter terminal, through the D channels and only to the filters of the authorized terminals.

In these filters, the specific signature becomes the predetermined message to be sought in the vocal information elements.

Figure 3:
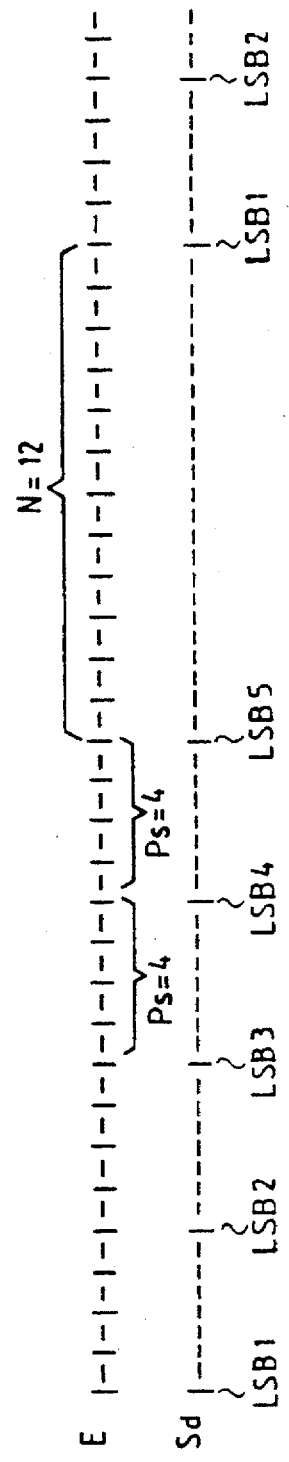
FIG. 3 shows a graph pertaining to a particular signal used in the context of the invention.

FIG. 3 is a graph which, for example, makes it possible to explain the way in which a signature structure is formed.

The signature is a code added to the samples representing the vocal message transmitted in the B channel. For the ISDN, the vocal signal is encoded by samples at the frequency of 8 kHz. Each sample represents the level, after encoding and compression, of the voice at a given instant. It is transmitted in the form of a TS of the frame. Regardless of the encoding law used, the least significant bit of a sample is the one that has the least influence on the representation of the amplitude of the original signal. It is thus possible to add a binary train distributed in the least significant bits of a sequence of samples without causing any excessive deterioration in the vocal quality of the signal. The adding of the signature is repeated cyclically, the characteristics parameters of such a signature are:

its length L in number of bits, its pitch P indicating the number of sampling intervals between two least significant bits of a signature, its interval N indicating the number of sampling intervals between two signatures.

These parameters have to be defined as a function of the performance characteristics to be achieved. Thus, for example, a signature with a length L=16 bits to where the bits are distributed every P=8 samples lowers the quality of the signal-to-noise ratio by about 6 dB during its transmission.

The signature function is integrated into the terminal at the vocal signal encoding device. It is the user who decides when it has to be activated and when it should no longer be transmitted. Hence, in the example described, the control station of the network does not control its operation but is warned of the contents of the signature by a D channel.

FIG. 3 shows how a signature is transmitted for L=5, P=4, N=12. This figure has a first line E on which vertical lines symbolize the instants of sampling of the vocal signal. The second line Sd of FIG. 3 uses vertical lines to indicate the position in time of the L=5 least significant bits LSB1 to LSB5 of the signature Sd considered. The pitch Ps=4 expressed in number of samples between two successive least significant bits of a signature is identified in the line E, as is the number N of sampling intervals between two successive signatures. In the example shown in FIG. 3, the signature is repeated periodically every 28 samples. Naturally, the bits PB1 to PB5 of the signature, even if they are represented by vertical lines in FIG. 3, are not necessarily logic "ones" Thus, the signature of FIG. 3 may be 11010 or any other combination of "ones" and "zero" and may be repeated periodically in this form.

It must be noted that variants may be proposed to the signature as just described. Thus, the least significant bits LSB forming the signature may be spaced out unevenly. This means that, in this case, the pitch P is not fixed.

The vocal signal, after it has been encoded, may be considered to be random and the signature may therefore be retrieved fortuitously. But the longer the signature, the smaller is this risk. Already, with a signature having a length of L=10, the probability is $10^{-3}$. By closing the switch J according to FIG. 2 only for a time slightly greater than 125×L=1250 microseconds of the repetition period of the signatures, the snatch of vocal signal that may be heard fortuitously has a very short duration. This duration, which is some milliseconds at worse, for a fairly lengthy signature is wholly insufficient for any understanding whatsoever of the vocal signal.

Figure 4:
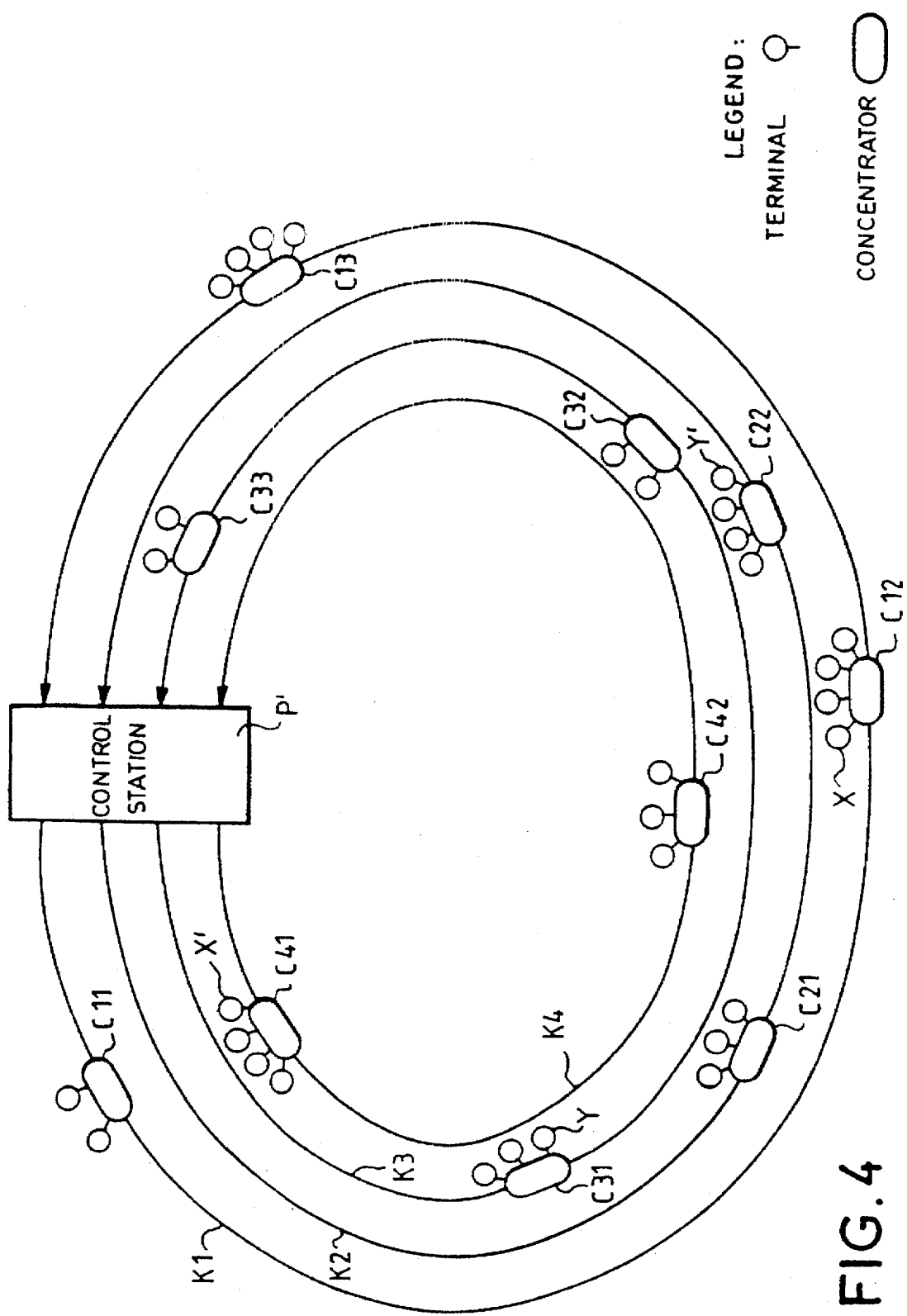

One variant of the embodiment according to FIG. 1 is made in the context of a local area network shown schematically and in a simplified manner in FIG. 4. This network has four loops K1 to K4 and a control station P'. In a standard way, the loops K2 to K4 are synchronized with the loop K1 so as to enable the easy transfer of the time slots from one loop to another. The control station has a control logic E to control the working of the network. The loop K1 has three concentrators C11, C12, C13, the loop K2 has two concentrators C21, C22, the loop K3 has three concentrators C31, C32, C33 and the loop K4 has two concentrators C41, C42. The terminals associated with the different concentrators have been represented by circles each connected by a line to the concentrator with which it is associated. Only four of these terminals X, X', Y, Y' respectively associated with the concentrators C12, C41, C31 and C22 have been referenced. For the making of the network according to the example described, the confidentiality had to be ensured only from one loop to another. In other words, there was no problem of confidentiality between the terminals of one and the same loop. This led to positioning the filters of calls not at the level of the concentrators, on the links with the terminals, but at the level of the control station P' as shown in FIG. 5 which is a partial simplified drawing showing the way in which the filters of calls are arranged within the control station P'.

Figure 5:
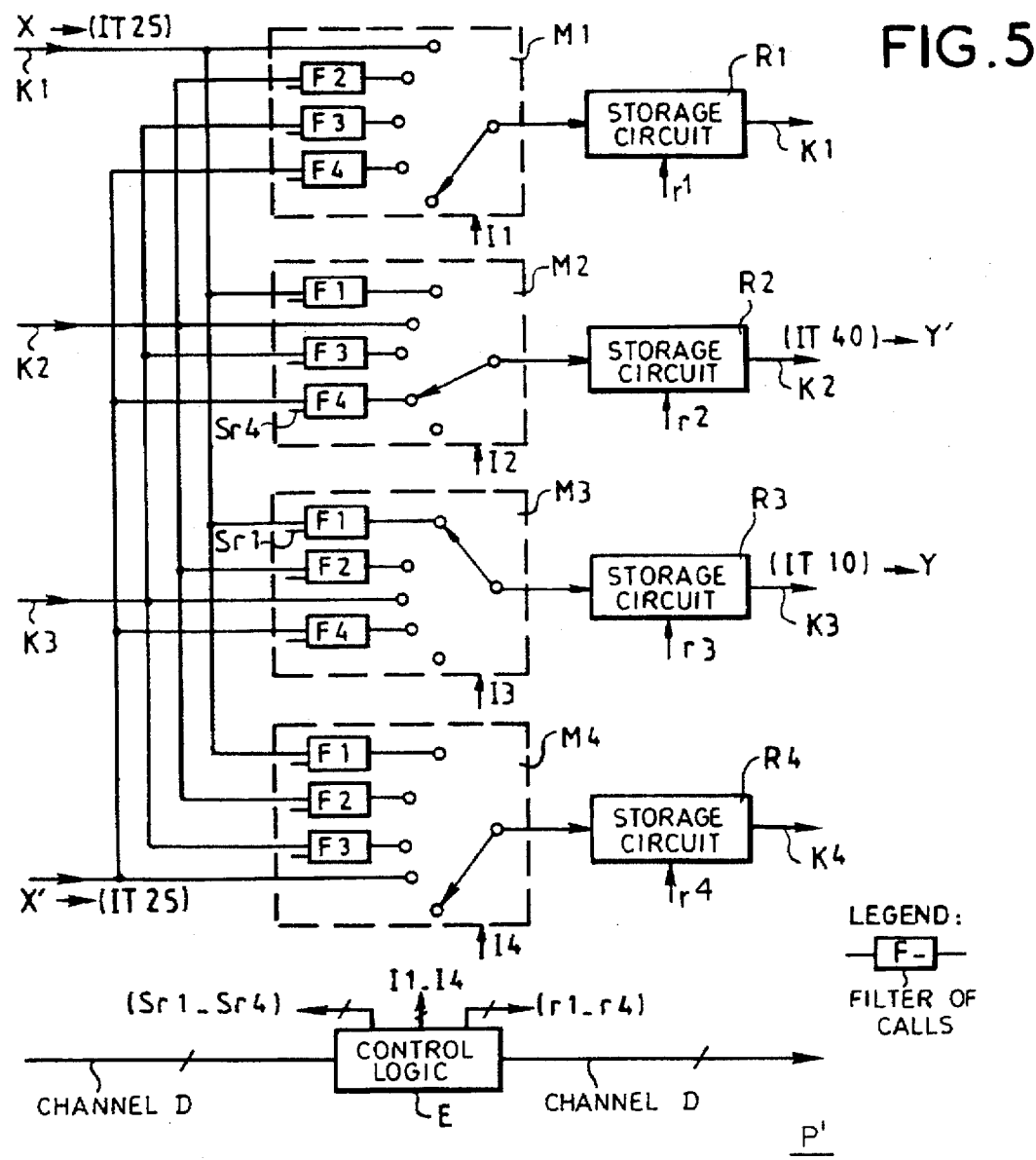
FIG. 5 shows a more detailed view of one of the elements of FIG. 4.

FIG. 5 shows four filtering and switching sets M1 to M4 each with four inputs and one output. The first, second, third and fourth inputs of the sets M1 to M4 are respectively coupled to the input ports of the loops K1 to K4 on the control station P' and the four outputs of the sets M1 to M4 are respectively coupled to the outgoing ports of the loops K1 to K4 of the control station P'.

Each of the four sets M1 to M4 has an electronic switch shown in FIG. 5 in the form of a five-position mechanical change-over switch whose central pin is the output of the filtering and change-over switch set considered and whose control is provided by a signal I1–I4 delivered by the control logic E.

Of the five pins of the change-over switch of each of the sets M1 to M4, the fifth is not connected and the other four which are respectively coupled to the four inputs of the loop K1 to K4. For the set M1, the four couplings respectively have a conductor, a filter F2, a filter F3 and a filter F4. For the set M2, the four couplings respectively have a filter F1, a conductor, a filter F3 and a filter F4. For the set M3, the four couplings respectively have a filter F1, a filter F2, a conductor and a filter F4. And for the set M4, the four couplings respectively have a filter F1, a filter F2, a filter F3 and a conductor. All these filters are filters of calls similar to the filter F of FIGS. 1 and 2.

In a standard way, the control station according to FIG. 5 has storage circuits R1 to R4 that couple the outputs of the four filtering and change-over switch sets M1 to M4 respectively to the outgoing ports of the loops K1 to K4. These storage circuits R1 to R4 are used, under the control of the control logic E, for the transfer from one loop to another, with a mean delay equal to the duration of two frames, of the information elements contained in the TS. The storage circuits R1–R4 make it possible, for example, to transfer the information from the TS 25 of the loop K1 to the TS 10 of the loop K3, i.e. from the twenty-fifth TS, also called channel 25, of the frames of the loop K1 to the tenth TS of the frames of the loop K3.

The control station P' that has just been described corresponds to a standard control station except for the presence of the filters of calls F1 to F4 which, in a standard control station, are simple conductors.

The operation of the network described above with reference to FIGS. 4 and 5 shall now be described assuming that the terminal X of the loop K1 according to FIG. 4 seeks to send a vocal message to the terminal Y of the loop K3 without it being possible for the terminals of the loops K2 and K4 to obtain knowledge of this message. Through a D channel, to terminal X sends a corresponding request to the control station P' informing the control P' of the terminal which the terminal X wishes the information to reach and, as in the example with only one loop, informing the control station P' of the signature Sr1 that the terminal X will associate with the vocal information. If the call is possible, the control station P' informs the transmitter terminal X and the receiver terminal Y thereof by means of the D channels by telling terminal X and Y which TS of the frame will be used to make the call.

It is assumed hereinafter that:

the terminal X sends vocal messages with a signature Sd1, p1 TS 25 is assigned to the messages transmitted in the loop K1 by the terminal X, TS 10 is assigned to the transmission of these messages in the loop K3, and that simultaneously one of the terminals of the loop K4 transmits vocal messages on the TS 25 with a signature Sd4 for one of the terminals of the loop K2 that receives these messages on the TS40.

Thus, the control logic E uses the signals I1 to I4 to position the switches of the sets M1 to M4 as indicated in FIG. 5 in order that:

TS 25 of the loop K1 is sent, through the filter F1 of the set M3, to the input of the storage circuit R3, TS 25 of the loop K4 is sent, through the filter F4 of the set M2, to the input of the storage circuit R2.

Furthermore, during the TS 25, the control logic E sends the predetermined messages Sr1=Sd1 and Sr4=Sd4 respectively to the reference inputs of the filters F1 of the set M3 and F4 of the set M2. For the filters of FIG. 5, the time during which the switch of these filters (J according to FIG. 2) remains closed after the desired signature has been recognized, has been taken to be slightly greater than the 125 microseconds of the duration of a frame. Finally, by a control signals R3 on the storage circuit r3 and a control signal r2 on the storage circuit R2, the control logic E delays the TS 25 of the loops K1 and K4 in such a way that they are respectively transferred as TS 10 in the loop K3 and as TS 40 in the loop K2.

In this way, the call from the terminal X to the terminal Y cannot be received because of a routing error by the terminals of the loops K2 and K4 so long as this call does not have a signature corresponding to the specific signature of the filters F1 of the sets M2 and M4. Similarly, the call from the terminals X' to the terminal Y'0 cannot be received by the terminals of the loops K1 and K3 so long as this call does not have a signature corresponding to the specific signature of the filters F4 of the sets M1 and M3.

The present invention is not limited to the examples described. Thus, in particular, it can be implemented in a multiple loop network with filters of calls both at the concentrators and at the control station.

Another variant consists in designing at least certain of the filters of calls so that they recognize a given signature, always the same one. This amounts to the application, to the reference input of the filter according to FIG. 2, of an invariable predetermined message Sr for which the control station does not have to take action, as the case may be, except to make the filter inoperative, namely to put the it in a state where it permanently lets messages pass through.

In general, the invention can be applied to all telecommunications local area networks whether they use digital transmission or not but wherein firstly a specific signature, whether digital or not, is added to a confidential vocal message during its transmission and wherein, secondly, call filtering means capable of recognizing a predetermined message are inserted at certain places of the network to create a break preventing the conveyance of the vocal messages to the places where, for a given period of time, they have not recognized the predetermined message within vocal messages.

What is claimed is:

1. A system to ensure the confidentiality of a vocal link in a telecommunications local area network, comprising:
    a plurality of terminals coupled to each other via voice transmission paths; and
    a filter, provided for at least one path of the voice transmission paths of the plurality of terminals, other terminals, with n as an integer at least equal to one, each of the filtering means which recognizes a predetermined message distributed over a plurality of voice messages transmitted over the voice transmission path for which the filter is provided;
    wherein:
        the filter disconnects the at least one voice transmission path for which the filter is provided if, for a given period of time, the filter has not recognized the predetermined message distributed over the plurality of transmitted voice messages,
        the filter allows at least one terminal of the plurality of terminals to store a signature in the filter as the predetermined message,
        the filter extracts the signature from the plurality of transmitted voice messages, each of the plurality of transmitted voice messages comprising a portion of the signature, and
        the plurality of transmitted voice messages are transmitted with a predetermined period.

2. The system according to claim 1, further comprising: concentrators connecting respective terminals of the plurality of terminals in the network, wherein the filter is located between at least one terminal of the plurality of terminals and a respective concentrator thereof.

3. The system according to claim 1, further comprising: a control station;
    wherein:
        the voice transmission paths comprise a a plurality of voice transmission path loops passing through the control station,
        the plurality of terminals are distributed in the plurality of voice transmission path loops, and
        the filter is located within the control station.

4. The system according to claim 1, wherein the at least one terminal of the plurality of terminals determine the signature to be stored in the filter and sends the signature by paths other than the voice transmission paths.

5. The system according to claim 1, wherein the filter is configured to receive and the system is configured to transmit the plurality of transmitted voice messages in digital form with the signature portion substituted for the least significant bit of the plurality of transmitted voice messages.

6. A telecommunications local area network, comprising:
    a control station;
    k voice transmission path loops, with k being an integer at least equal to one, passing through the control station;
    a plurality of concentrators, each having a plurality of terminals connected thereto, provided in each of the k voice transmission path loops, each of the plurality of terminals configured to transmit and receive voice messages via the control station, the k voice transmission path loops, and the concentrators; and
    a plurality of filters provided for each of the k voice transmission path loops;
    wherein:
        at least one filter of the plurality of filters recognizes a predetermined message distributed over a plurality of voice messages transmitted over the voice transmission path loop for which the plurality of filters are provided, and disconnects the voice transmission path loop for which the plurality of filters are provided if, for a given period of time, the at least one filter of the plurality of filters has not recognized the predetermined message distributed over the plurality of transmitted voice messages and
        the least one filter of the plurality of filters allows at least one terminal of the plurality of terminals to store a signature in the at least one filter of the plurality of filters as the predetermined message,
        the least one filter of the plurality of filters extracts the signature from the plurality of transmitted voice messages, each of the plurality of transmitted voice messages comprising a portion of the signature, and
        the plurality of transmitted voice messages are transmitted with a predetermined period.

7. The local area network according to claim 6, wherein at least a part of the plurality of filters is provided between the plurality of terminals and a concentrator to which the plurality of terminals are coupled.

8. The local area network according to claim 6, wherein k is greater than 1, and at least a part of the plurality of filters is provided in the control station.

9. A method to ensure the confidentiality of a local area network having a plurality of terminals coupled to each other via voice transmission paths, comprising the steps of:
    filtering at least one path of the voice transmission paths of the plurality of terminals so as to recognize a predetermined message distributed over a plurality of voice messages transmitted over the at least one path of the voice transmission paths;
    disconnecting the at least one path of the voice transmission paths if, for a given period of time, the filtering step has not recognized the predetermined message distributed over the plurality of transmitted voice messages;

allowing at least one terminal of the plurality of terminals to store a signature as the predetermined message in the filtering step;

extracting the signature from the plurality of transmitted voice messages, each of the plurality of transmitted voice messages comprising a portion of the signature, in the filtering step; and transmitting the plurality of transmitted voice messages with a predetermined period.

10. The method according to claim 9, wherein the transmitting step comprises:

transmitting the plurality of transmitted voice messages in digital form with the signature portion substituted for the least significant bit of the plurality of transmitted voice messages.

11. A method to ensure the confidentiality of a local area network having a control station, k voice transmission path loops, with k being an integer at least equal to one, passing through the control station, a plurality of concentrators, each having a plurality of terminals connected thereto, provided in each of the k voice transmission path loops, comprising the steps of:

filtering each of the k voice transmission path loops so as to recognize a predetermined message distributed over a plurality of voice messages transmitted over each of the k voice transmission path loops;

disconnecting at least one of the k voice transmission path loops if, for a given period of time, the filtering step has not recognized the predetermined message distributed over the plurality of transmitted voice messages;

allowing at least one terminal of the plurality of terminals to store a signature as the predetermined message as part of the filtering step;

extracting the signature from the plurality of transmitted voice messages, each of the plurality of transmitted voice messages comprising a portion of the signature, as part of the filtering step; and transmitting the plurality of transmitted voice messages with a predetermined period.

12. The method according to claim 11, wherein the transmitting step comprises:

transmitting the plurality of transmitted voice messages in digital form with the signature portion substituted for the least significant bit of the plurality of transmitted voice messages.

13. A system to ensure the confidentiality of a local area network, comprising:

a plurality of terminals coupled to each other via voice transmission paths; and filtering means, provided in at least one path of the voice transmission paths of the plurality of terminals, for recognizing a predetermined message within a plurality of voice messages transmitted over the voice transmission path for which the filtering means is provided;

wherein:

the filtering means disconnects the at least one voice transmission path for which the filtering means is provided if, for a given period of time, the filtering means has not recognized the predetermined message distributed over the plurality of transmitted voice messages, the filtering means allows at least one terminal of the plurality of terminals to store a signature as the predetermined message in the filtering means;

the filtering means extracts the signature from the plurality of transmitted voice messages, each of the plurality of transmitted voice messages comprising a portion of the signature, and the plurality of transmitted voice messages are transmitted with a predetermined period.

14. The system according to claim 13, wherein the filtering means includes means to receive and the system further includes means to transmit the plurality of transmitted voice messages in digital form with the signature portion substituted for the least significant bit of the plurality of transmitted voice messages.

15. A system to ensure the confidentiality of a local area network, comprising:

a control station;

k voice transmission path loops, with k being an integer at least equal to one, passing through the control station;

a plurality of concentrators, each having a plurality of terminals connected thereto, provided in each of the k voice transmission path loops;

a plurality of filtering means, provided in each of the k voice transmission path loops, for recognizing a predetermined message within a plurality of voice messages transmitted over the voice transmission path loop for which the plurality of filtering means are provided;

wherein:

the plurality of filtering means disconnect the voice transmission path loop for which the plurality of filtering means are provided if, for a given period of time, the plurality of filtering means have not recognized the predetermined message distributed over the plurality of transmitted voice messages;

the plurality of filtering means allow at least one terminal of the plurality of terminals to store a signature as the predetermined message in the plurality of filtering means;

the plurality of filtering means extract the signature from the plurality of transmitted voice messages, each of the plurality of transmitted voice messages comprising a portion of the signature; and the plurality of transmitted voice messages are transmitted with a predetermined period.

16. The system according to claim 15, wherein the plurality of filtering means includes means to receive and the system further includes means to transmit the plurality of transmitted voice messages in digital form with the signature portion substituted for the least significant bit of the plurality of transmitted voice messages.

17. The system according to claim 15, wherein at least parts of the plurality of filtering means are provided between the plurality of terminals and a concentrator to which the plurality of terminals are coupled.

18. The system according to claim 16, wherein k is greater than 1, and at least parts of the plurality of filtering means are provided in the control station.

19. The system according to claim 1, wherein the predetermined period is greater than a frame rate of the telecommunications local area network so that the portion of the signature is not transmitted during every frame of transmitted voice messages.

20. The system according to claim 6, wherein the predetermined period is greater than a frame rate of the telecomnunications local area network so that the portion of the signature is not transmitted during every frame of transmitted voice messages.

21. The method according to claim 9, wherein the transmitting step comprises:

transmitting the plurality of transmitted voice messages with the predetermined period being greater than a frame rate of the telecommunications local area network so that the portion of the signature is not transmitted during every frame of transmitted voice messages.

22. The method according to claim 11, wherein the transmitting step comprises:

transmitting the plurality of transmitted voice messages with the predetermined period being greater than a frame rate of the telecommunications local area network so that the portion of the signature is not transmitted during every frame of transmitted voice messages.

23. The system according to claim 13, wherein the predetermined period is greater than a frame rate of the telecommunications local area network so that the portion of the signature is not transmitted during every frame of transmitted voice messages.

24. The system according to claim 15, wherein the predetermined period is greater than a frame rate of the telecommunications local area network so that the portion of the signature is not transmitted during every frame of transmitted voice messages.

* * * * *